No. 887,740. PATENTED MAY 12, 1908.
L. R. PHILLIPS.
GEOGRAPHICAL GLOBE.
APPLICATION FILED JAN. 14, 1908.
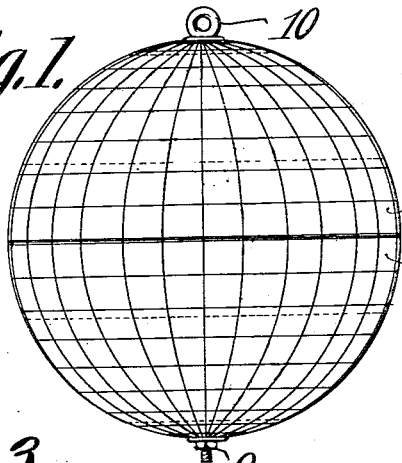
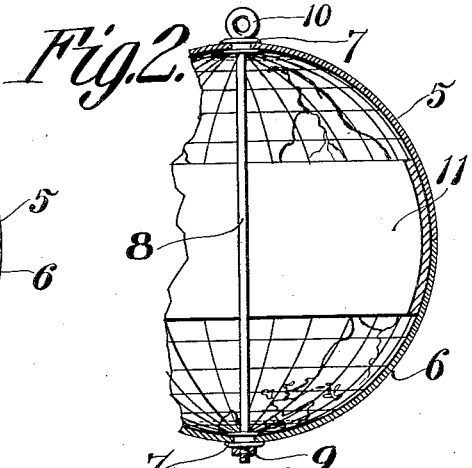
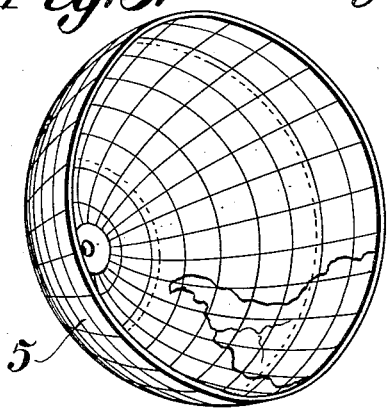
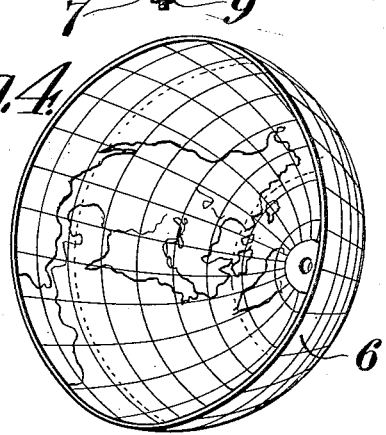
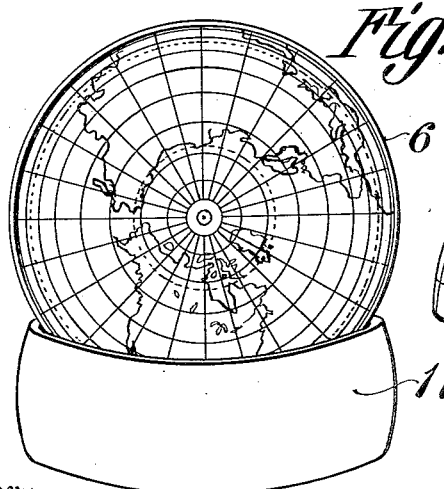
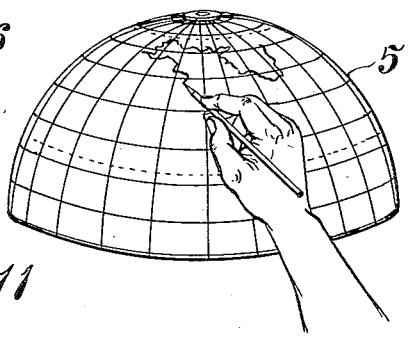
Inventor
Loren R. Phillips.
Witnesses
By C. A. Snow & Co
Attorneys

UNITED STATES PATENT OFFICE.

LOREN R. PHILLIPS, OF COLLBRAN, COLORADO, ASSIGNOR OF ONE-HALF TO ELMER E. MERRILL, OF MINNEAPOLIS, MINNESOTA.

GEOGRAPHICAL GLOBE.

No. 887,740.   Specification of Letters Patent.   Patented May 12, 1908.

Application filed January 14, 1908. Serial No. 410,817.

*To all whom it may concern:*

Be it known that I, LOREN R. PHILLIPS, a citizen of the United States, residing at Collbran, in the county of Mesa and State of Colorado, have invented a new and useful Geographical Globe, of which the following is a specification.

This invention relates to educational devices and more particularly to a geographical globe.

The primary object of the invention is to provide a geographical globe especially designed for use in schools and other educational circles for teaching geography.

A further object of the invention is to provide a geographical globe including a plurality of separable sections on the inner or concave surface of each of which is printed or otherwise represented a map segment, the exterior or convex walls of the globe sections being provided with a drawing or delineating surface so that the pupil may use the map on the concaved surface of the globe section as a copy when drawing or otherwise representing the map on the convex surface of the mating section.

A further object is to provide the globe with an intermediate band or annulus which serves as a stand or support for one of the globe sections when representing the map on the other section.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a side elevation of a geographical globe constructed in accordance with my invention. Fig. 2 is a vertical sectional view of the same. Fig. 3 is a perspective view of the upper section of the globe detached. Fig. 4 is a similar view of the lower section detached. Fig. 5 is a perspective view showing the manner of supporting one of the globe sections when reproducing the map on the exterior surface of the mating section.

Similar numerals of reference indicate corresponding parts in all of the figures of the drawings.

The improved geographical globe forming the subject matter of the present invention is principally designed for use in school rooms and other educational circles for teaching physical geography, and in its preferred embodiment comprises a hollow body formed of separable sections or hemispheres 5 and 6.

The sections 5 and 6 may be formed of papier mâché, card-board, aluminum, or other suitable material, and are each preferably provided with an opening having an eyelet 7 seated therein and registering with the eyelet of the adjacent section for the reception of a retaining rod 8.

One end of the rod 8 is threaded for engagement with a nut 9 while the opposite end thereof is formed with a terminal eye or loop 10 by means of which the globe may be conveniently suspended from a nail or other suitable support.

The exterior or convex walls of the globe sections 5 and 6 are covered with a drawing or delineating surface upon which may be printed or otherwise represented a plurality of intersecting vertical and circumferential lines representing respectively the meridians of longitude and the parallels of latitude, said drawing surface being also provided with circumferential markings corresponding to the equator, the tropic of capricorn, and the tropic of cancer.

If desired, however, the lines representing the meridians of longitude and parallels of latitude and also the lines representing the tropics may be dispensed with and the exterior walls of the globe sections provided with a plane delineating surface, without departing from the spirit of the invention.

Printed or otherwise represented on the interior or concave walls of each section is a map segment which, when the sections are united, forms a complete map of the world, the lower section 6 being preferably provided with a map of the northern hemisphere and the upper section 5 with a map of the southern hemisphere so that when the lower section 6 is detached, the map of the northern hemisphere may be represented on the exterior drawing surface of the section 5, as will be more fully explained hereinafter.

Disposed within the sections 5 and 6 and conforming to and bearing against the interior walls of said sections is an annular band or coupling member 11 which is preferably formed of the same material as the body of the globe and which assists in retaining the globe sections in proper position, said annulus or band also serving as a stand or support for one of said sections when the map is being copied from the concave face of said section and reproduced on the exterior drawing or delineating surface of the mating section.

In using the globe the rod 8 is detached by rotating the finger piece or eye 10 and the lower section 6 containing the map of the northern hemisphere inserted in the annulus or stand 10 after which the upper section 5 is placed, open end down, upon a drawing table or desk in front of the stand 11 so that the scholar by referring to the map on the inner face of the section 6 may readily draw or otherwise delineate the map of the northern hemisphere on the exterior drawing surface of the upper section 5, as best shown in Fig. 5 of the drawings.

After the map of the northern hemisphere is represented on the exterior drawing surface of the upper section 5 the section 6 is removed from the stand or annulus 11 and placed on the table in front of said stand and the section 5 inserted in the annulus and the drawing operation continued so as to represent the map of the southern hemisphere on the exterior drawing surface of the lower section.

When the map is completed the globe sections are assembled by inserting the rod 8 within the bearings or eye-lets 7, as best shown in Fig. 2 of the drawings, after which the globe may be suspended from a support for the purpose of exhibition.

Attention is here called to the fact that the eye-lets 7 not only serve to receive the retaining rod 8 but also form bearings for the rod so that the globe may be rotated around the rod as an axis.

It will also be noted that the globe sections may be supported at any angle or inclination within the annulus or stand 11, while the latter when in position on the interior walls of the globe assists in retaining the sections in proper position and also serves to reinforce and strengthen said sections at their point of juncture.

By making the globe sections hollow the latter, when assembled, form a receptacle or pocket for the reception of the pencils, dividers, erasers and other drawing instruments or material.

Having thus described the invention what is claimed is:

1. A hollow opaque body having an exterior delineating surface and including separable sections, and a copy displayed on the interior surface of the body and adapted to be reproduced on said delineating surface.

2. A hollow opaque body having an exterior delineating surface and including separable sections adapted to be assembled to form a closed structure, and a copy displayed on the interior surface of the body and adapted to be reproduced on said delineating surface.

3. A hollow body having an exterior delineating surface and including separable sections, a copy arranged within the body and adapted to be reproduced on said delineating surface, and a rod piercing said sections and having one end thereof provided with a suspension device.

4. A hollow globe having an exterior drawing surface and including separable sections, and a copy arranged within the globe and adapted to be reproduced on said drawing surface.

5. A hollow globe including separable sections each provided with an exterior drawing surface, and a copy secured to and conforming to the concave walls of the globe and adapted to be reproduced on the drawing surface.

6. A hollow globe including separable hemispheres each having a map represented on its concaved walls, the convex walls of the hemisphere being provided with a delineating surface.

7. A hollow globe including separable sections each having an exterior drawing surface, there being a map represented on the interior walls of the globe.

8. A hollow globe including separable sections each having a map represented on its interior walls and provided on its exterior walls with a delineating surface.

9. A hollow globe including separable hemispheres each having an exterior delineating surface, there being a map secured to the interior walls of the globe and arranged in inverted position.

10. A hollow globe including separable sections each having an exterior delineating surface, there being a map represented on the interior walls of the globe sections, and means connecting said sections and forming a support for one of the sections when said sections are detached.

11. A hollow globe including separable hemispheres provided with alined openings and each having a map represented on its concaved walls and its convex walls provided with a drawing surface, and a retaining rod extending through said openings for locking the hemispheres in contact with each other.

12. A hollow globe including separable sections having alined openings formed therein and each provided with an exterior drawing surface, there being a map represented on the interior walls of said sections, a rod threaded through said openings, and an annulus disposed at the juncture of said sections and forming a support for one of the sections when said sections are detached.

13. A hollow globe including separable sections each provided with an exterior drawing surface and having a map represented on the interior walls thereof, and an annulus bearing against the interior walls of said sections at the juncture of the latter, said annulus forming a support for one of the sections when said sections are detached.

14. A hollow globe including separable sections each having a map represented on the interior walls thereof and provided on its exterior walls with a drawing surface, said drawing surface being provided with intersecting lines representing parallels of latitude and meridians of longitude.

15. A hollow globe including separable sections each having a map segment represented on the interior walls thereof and provided with an exterior drawing surface, a connecting member arranged in contact with the interior walls of the sections at the juncture thereof and forming a stand for one of the sections when said sections are attached, and means for clamping the sections in engagement with each other.

16. A hollow globe having an exterior delineating surface and including separable hemispheres, a copy arranged within the globe and adapted to be reproduced on the delineating surface, and a rod piercing said hemispheres and on which the globe is adapted to rotate.

In testimony that I claim the foregoing as my own, I have hereto affixed my signature in the presence of two witnesses.

LOREN R. PHILLIPS.

Witnesses:
W. E. PHILLIPS,
FRANK P. TANNER.